United States Patent [19]

Nomura et al.

[11] Patent Number: 4,648,663
[45] Date of Patent: Mar. 10, 1987

[54] WHEEL SLIP CONTROLLING SYSTEM

[75] Inventors: Yoshihisa Nomura; Masakazu Ishikawa, both of Toyota; Akira Shirai, Toyoake; Takahiro Nogami, Toyota; Kazumasa Nakamura; Kaoru Ohashi, both of Okazaki, all of Japan

[73] Assignee: Toyota Jidosha Kabushiki Kaisha, Aichi, Japan

[21] Appl. No.: 775,007

[22] Filed: Sep. 11, 1985

[30] Foreign Application Priority Data

Sep. 28, 1984 [JP] Japan ................................. 59-205265
May 8, 1985 [JP] Japan ............................ 60-68437[U]

[51] Int. Cl.$^4$ ........................... B60T 8/40; B60L 3/10
[52] U.S. Cl. ..................................... 303/106; 303/96;
303/119; 303/116; 303/DIG. 4; 180/197
[58] Field of Search .................... 303/96, 97, 106, 105,
303/111, 110, 116, 115, 119; 188/181 A, 181 R,
181 C; 364/42 C; 180/197

[56] References Cited

U.S. PATENT DOCUMENTS

| | | | |
|---|---|---|---|
| 3,582,152 | 6/1971 | Burckhardt | 303/96 |
| 3,825,306 | 7/1974 | Fink | 180/197 |
| 3,893,535 | 7/1975 | Burckhardt et al. | 303/96 |
| 3,909,071 | 9/1975 | Klatt | 303/106 |
| 4,033,637 | 7/1977 | Leiber | 303/115 |
| 4,462,642 | 7/1984 | Leiber | 303/116 |

*Primary Examiner*—Gerald L. Brigance
*Assistant Examiner*—Alvin Oberley

*Attorney, Agent, or Firm*—Parkhurst & Oliff

[57] ABSTRACT

A wheel slip controlling system according to the present invention comprises braking actuator operable by a driver of a car for braking rotation of wheels at least including driving wheels, slip detector for detecting a slipping condition of the wheels to output a slip signal indicative of the slipping condition, anti skid controller for receiving the slip signal and for controlling, in response to the slip signal received, the pressure to be imparted from the braking actuator with a self-contained pressure source to control braking slips of said wheels at least including the driving wheels and traction controller responsive to the slip signal during acceleration of the car for controlling the driving wheels with the self-contained pressure source for control acceleration slips at least of the driving wheels. Since the system makes use of the pressure of a hydraulic source of a conventional anti skid brake system and controls a braking system, quick responsiveness can be obtained without the necessity of extensive modification of the conventional anti skid brake system. When a driver carries out a braking operation to exhibit his own braking will, the braking operation will have a priority so that the slip control can be attained without deterioration of the treadling feeling of a brake pedal. If any other controlling technique such as priority of stabilized brake hydraulic pressure with a hysteresis is used in combination for selection of traction control, more stabilized acceleration slip control can be attained.

4 Claims, 12 Drawing Figures

Control of the two position valve

Control of the three position valve

WHEEL SLIP CONTROLLING SYSTEM

BACKGROUND OF THE INVENTION

1. Field of the Invention

This invention relates to a wheel slip controlling system for controlling a frictional force between a tire of a driving wheel and the road surface not only during braking but also during acceleration of a car, and more particularly to a wheel slip controlling system which controls rotation of a driving wheel in response to the output power of an internal combustion engine.

2. Prior Art

An antiskid brake system is conventionally known which controls rotation of a wheel to provide an optimum braking force when braking the speed of a car, without causing a wheel lock. In this type of system, the rotational speed of a wheel (hereinafter referred to as a wheel speed) is controlled, during braking of a car, below a travelling speed of the a car (hereinafter referred to as a car speed) so as to provide a maximum frictional force between a tire of a wheel and the road surface. In particular, where a car speed is indicated by Vs and a wheel speed by V, and the slip ratio S, determined by the following equation $$S = [(Vs - V)/Vs] \times 100,$$

approaches 10%, a frictional force M between a tire and the road surface becomes maximum and a side force F which is a resistance to a side slip of a vehicle presents an appropriate value. Therefore, the wheel speed is controlled to a speed calculated by the following equation $$V = (1-\alpha)Vs - \beta$$

where $\alpha$ is a constant (for example, 0.03) and $\beta$ is another constant (for example, 4 [km]), in such a manner that the slip ratio S may be held around 10%.

While various slip controls for braking the speed of a car have been proposed so far wherein safety steps are taken so that if a driver brakes a car very quickly, the car may be stopped at a minimum distance without causing a side slip of the car. Proposals for traction control, which is control of a slip during acceleration of a car, have been limited only to such that wherein an output power of an engine is controlled when an acceleration slip occurs at a wheel, and efforts have not been made enough to attain optimum control of the acceleration of a car.

Moreover, conventional traction controls have a drawback that a rapid change in running condition of an internal cumbustion engine may produce vibrations or cause deterioration of exhaust gas emission very quickly since an output of the engine is controlled by ignition timing and air fuel ratio. They also have another drawback in responsibility of control since a time is required until engine torque is lowered after ignition timing control or air fuel ratio control has been initiated.

SUMMARY OF THE INVENTION

It is a first object of the present invention to provide an improved wheel slip controlling system which, when a slip occurs during acceleration or deceleration of a car, can control a frictional force between a tire of a driving wheel and the road surface in good responsibility without deteriorating the drivability of the car.

It is a second object of the invention to provide a wheel slip controlling system which can make use of pressure of a hydraulic oil source of a conventional antiskid brake system to attain quick responsibility of control as a system for controlling a brake system without the necessity of great modification of a conventional antiskid brake system.

In order to attain these objects, a wheel slip controlling system according to the present invention comprises, as shown in FIG. 1 which illustrates a basic construction of the system, (a) braking means (5, 7) for braking rotation of wheels at least including driving wheels (operable by a driver);

(b) slip detecting means (8A, 8B) for detecting a slipping condition of said wheels and for outputting a slip signal indicative of the slipping condition;

(c) antiskid controlling means (1, 3) for controlling the pressure to be imparted from said braking means with a self-contained pressure source according to a slip signal and for controlling a braking slip of said wheels at least including said driving wheels; and (d) traction controlling means (9) responsive to the slip signal outputted from said slip detecting means during acceleration of said car for controlling said driving wheels with said self-contained pressure source and for controlling acceleration slips at least of said driving wheels.

An antiskid brake system employed in a wheel slip controlling system of the present invention operates such that a hydraulic pressure of a hydraulic circuit which hydraulically brakes wheels may be varied in response to results of detection by self-contained slip detecting means to obtain a large braking force without causing locking of wheels. Here, the slip detecting means receives and processes necessary information to estimate a slipping condition of wheels including at least driving wheels, that is, a frictional force between a wheel and the road surface. Further, the antiskid brake system has a hydraulic source contained therein to vary the hydraulic pressure as described hereinabove.

Meanwhile, a traction controlling means operates a hydraulic oil circuit which provides a braking force to the car using a hydraulic source contained in an antiskid brake system when slip detecting means included in the antiskid brake system detects a slipping condition of a driving wheel, during acceleration of the car. For example, where a hydraulic circuit is operated by hydraulic pressure of a master cylinder which operates in connection with a foot brake treadled by a driver, the hydraulic pressure of the master cylinder is raised, using a hydraulic source within the antiskid braked system, as a means of control under the same condition as if the driver operates the hydraulic circuit desiring a braking force.

Now, in order to have the present invention understood more concretely, the invention will be described in more detail in connection with the preferred embodiment thereof.

DETAILED DESCRIPTION OF THE PREFERRED EMBODIMENTS

Figure 1:
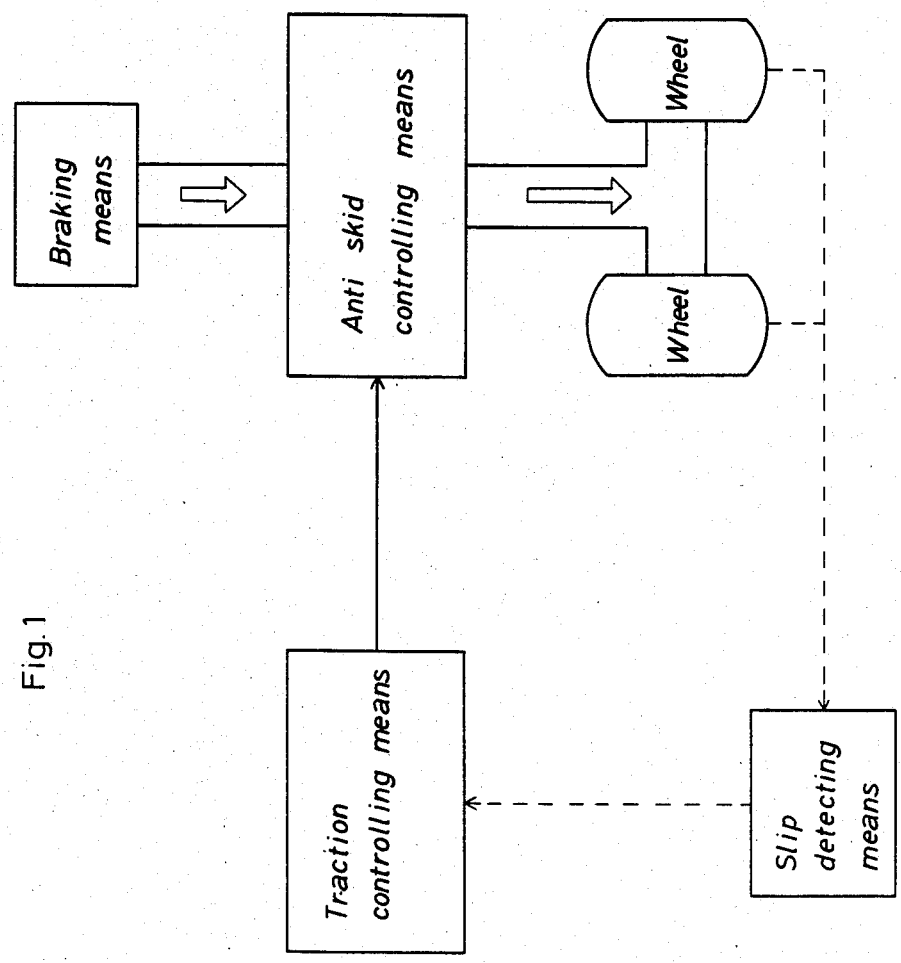
FIG. 1 is a diagram illustrating a basic construction of the present invention.
Figure 2:
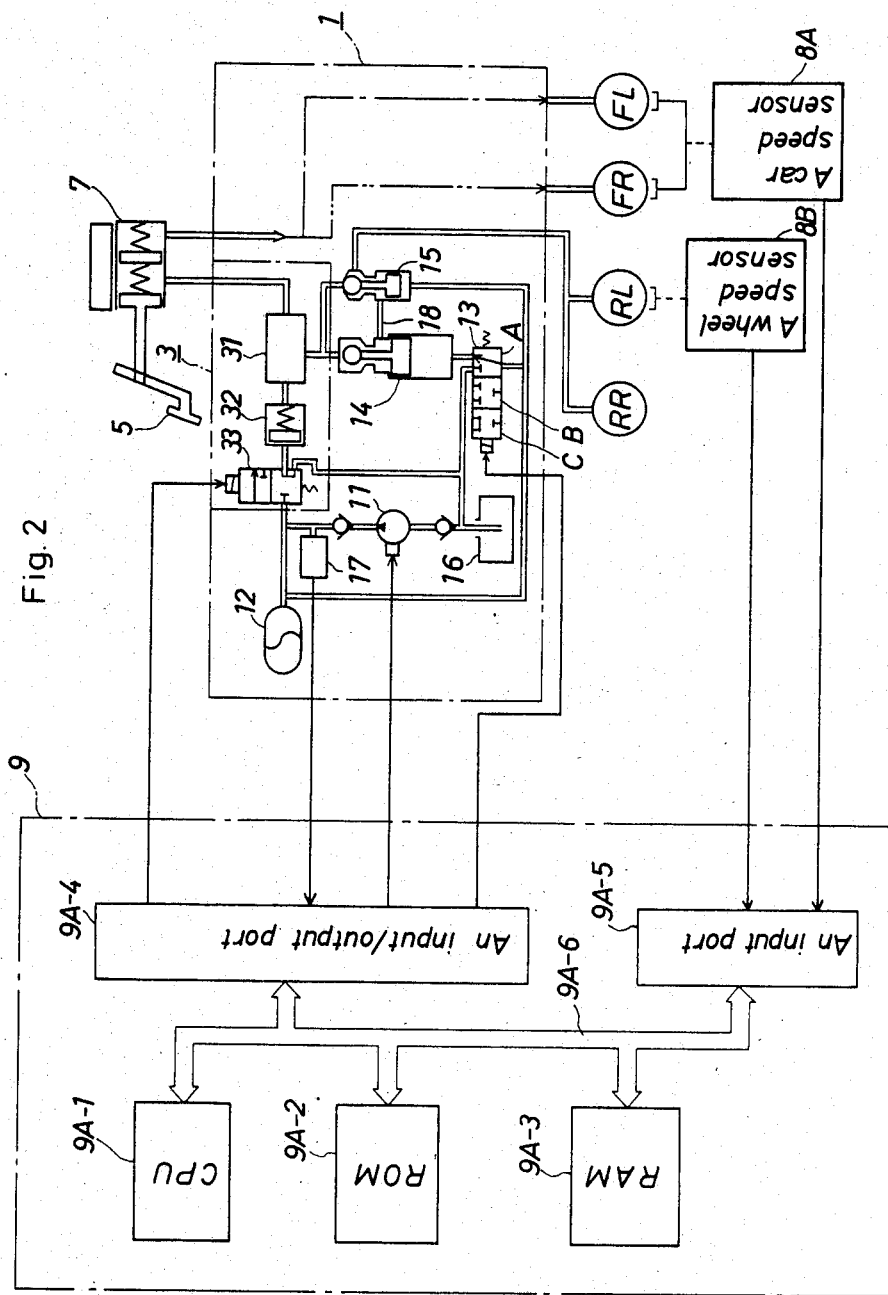
FIG. 2 is a block diagram illustrating construction of a first embodiment.

FIG. 2 is a schematic diagram of a hydraulic braking system and a controlling system therefor in a car on which a wheel slip controlling system of a first embodiment of the present invention is installed.

Referring to FIG. 2, reference numeral 1 denotes a hydraulic system of a conventional antiskid brake system and 3 denotes a hydraulic system newly provided for traction control. In particular, if a foot brake 5 is treadled to operate a master cylinder 7 of the tandem type, a braking force is produced at both of left and right front wheels (FL, FR) and left and right rear wheels (RL, RR) corresponding to a hydraulic pressure, and the hydraulic system 1 of the antiskid brake system for suitably varying the hydraulic pressure of the hydraulic circuit is provided in the hydraulic circuit. FIG. 2 shows only a hydraulic oil path for the rear wheels in detail for simplification.

Rotational speeds of the front and rear wheels to which a braking force is applied as described above are detected by a car speed sensor 8A and a wheel speed sensor 8B and are transmitted to an electronic controlling device 9. The car speed sensor 8A calculates an average rotational speeds of the left and right front wheels FL and FR and thus outputs a signal which is regarded as a travelling speed of the car while the wheel speed sensor 8B only outputs a signal indicative of a rotational speed of a driving wheel only.

Now, detailed construction of each system will be described.

First, the hydraulic system 1 of the antiskid brake system includes a cut valve 14 to which a flow of oil is changed over by means of a three position solenoid valve 13 from a hydraulic source of an accumulator 12 which stores therein oil to be fed under pressure by a hydraulic pump 11, a bypass valve 15 for assuring operation of the braking hydraulic circuit when the hydraulic source gets out of order and so on, a reservoir 16 for temporarily storing excessive oil therein, and a hydraulic switch 17 for detecting a hydraulic pressure of the hydraulic source to provide an output when a predetermined hydraulic pressure is obtained.

FIG. 2 indicates the hydraulic system when the antiskid brake system does not operate. A piston of the bypass valve 15 is normally held upward by oil pressure from the accumulator 12 which is maintained at a high pressure by the pump 11 so that oil from a pressure change-over valve 31 which will be hereinafter described does not go into the bypass valve 15 and all flows into the cut valve 14. At this instant, a piston of the cut valve 14 is also held upward since the three position valve 13 is connected at an A port thereof to the cut valve 14. The upward pressure of the accumulator 12 is higher than the pressure of the pressure change-over valve 31, and accordingly oil which flows into the cut valve 14 from the pressure change-over valve 31 goes out of an upper chamber of the cut valve 14, passes a bypass path 18 and then an upper chamber of the bypass valve 15, and provides a braking force to the driving wheels RR and RL.

In other words, the bypass valve 15 only acts as a bypass hydraulic path which imparts a braking force to driving wheels via an upper chamber of the bypass valve 15 so far as the hydraulic pressure from the accumulator 12 is normal while the cut valve 14 holds the capacity of the upper chamber to its minimum and unchangeable when the three position valve 13 is connected at the A port to the cut valve 14 so that the braking hydraulic pressure can be controlled only by a pressure of the pressure change-over valve 31.

If the antiskid brake system discriminates in response to some signal that it is necessary to reduce the hydraulic pressure imparted from the pressure change-over valve 31 to the driving wheels to reduce the braking force. The electronic controlling device 9 actuates the three position valve 13 to connect a C port to the hydraulic system. Then, the pressure in a lower chamber below the piston of the cut valve 14 becomes equal to the low pressure of the reservoir 16, and as a result, the piston is pushed down by the pressure of the pressure change-over valve 31 to increase the volume of oil and lower the hydraulic pressure in the upper chamber of the cut valve 14 which has provided the braking force to the driving wheels RR and RL, resulting in reduction in the braking force. Then, if a B port of the three position valve 13 is connected to the hydraulic system after the piston of the cut valve 14 has been lowered to a position at which a suitable braking force can be obtained, then the movement of the piston of the cut valve 14 will be ended and the pressure in the upper chamber of the cut valve 14 which provides the braking force will be fixed.

If the hydraulic system of the antiskid brake system becomes out of order for any reason so that the pressure of the accumulator 12 becomes low, then the piston of the bypass valve 15 moves down so that a spherical valve at the top of the piston divides a valve body into an upper chamber and a lower chamber while the cut valve 14 is divided into two upper and lower chambers as the piston thereof moves down. Then, the pressure of the pressure change-over valve 31 is introduced directly into the upper chamber of the bypass valve 15 to form a new hydraulic system which will provide a braking force to the driving wheels RR and RL to assure a braking operation according to the will of the driver.

Next the hydraulic system 3 which is provided anew for traction control will be described. First while a hydraulic system of a conventional antiskid brake system is constructed such that oil pressure from the master cylinder 7 of the foot brake is directly introduced into the cut valve 14 and the bypass valve 15, the pressure change-over valve 31 is provided anew in the hydraulic system such that oil pressure may be introduced into both valves 14 and 15 via the pressure change-over valve 31. The pressure change-over valve 31 is a valve of the 2-input 1-output type which selectively outputs the input which is higher in pressure than the other. The master cylinder 7 of the foot brake 5 is connected to one of the two inputs of the pressure change-over valve 31 while another cylinder 32 is connected to the other input. The above described accumulator 12 serves as a power source for operating the cylinder 32, and a two position valve 33 which is controlled by the electronic controlling device 9 and which provides intermitent connection between the accumulator 12 and the cylinder 32.

The electronic controlling device 9 detects a condition of the braking hydraulic system as described above and produces a controlling output depending upon such detection. In particular, the electronic controlling device 9 receives three output signals from the car speed sensor 8A, the wheel speed sensor 8B and the hydraulic switch 17 as detection information of the braking hydraulic system and controls the pump 11, the three position valve 13 and the two position valve 33 in the hydraulic system in accordance with results of such detection. FIG. 2 illustrates a block diagram wherein the electronic controlling device 9 is constructed, for example, by digital circuits including a microcomputer at the center thereof. Referring to FIG. 2, reference symbol 9A-1 denotes CPU which carries out operation, 9A-2 ROM which stores a controlling program and various constants therein, 9A-4 an input/output port which outputs controlling signals for operating several hydraulic valves and the pump 11 in the hydraulic system and which shapes and receives a signal from the hydraulic switch 17, 9A-5 an input port which receives signals from the two speed sensors, and 9A-6 a bus line forming a passage of information.

Figure 3:
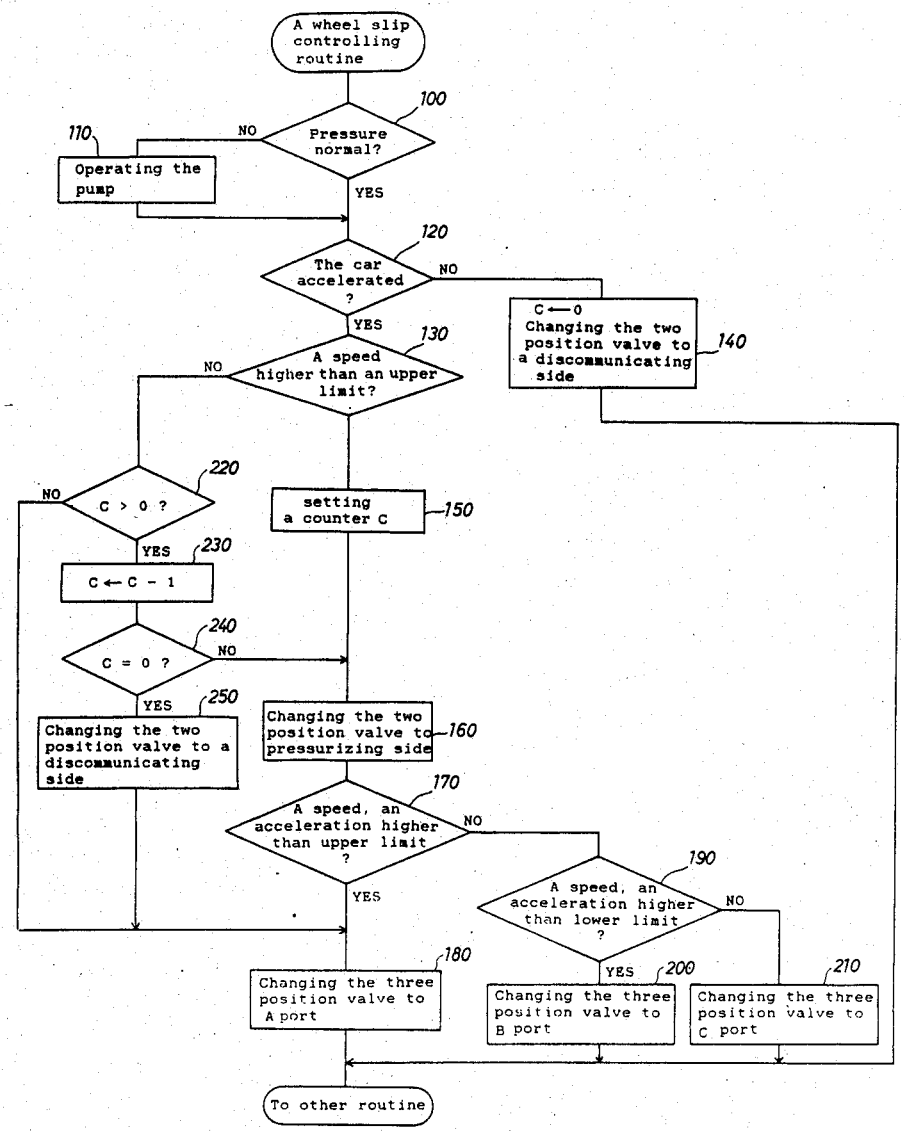
FIG. 3 a flow chart of a control program for the system of FIG. 2.

The wheel slip controlling system of the present embodiment having such a construction as described above operates in accordance with a flow chart illustrated in FIG. 3. The flow chart indicates a wheel slip controlling routine which is stored in the ROM 9A-2 and is executed repeatedly every predetermined period of time to control a slip of wheels.

If the CPU 9A-1 advances into a process of the wheel slip controlling routine, the first step 100 is executed to discriminate if the pressure of the hydraulic system is normal or not. The pressure of the accumulator 12 of the antiskid brake system is detected by the hydraulic switch 17 as described hereinabove, and if the pressure lowers, the hydraulic switch 17 will provide no output. Thus, the output of the hydraulic switch 17 is monitored, and if there is no output from the hydraulic switch 17, step 110 is once executed to operate the pump 11 to raise the pressure of the accumulator 12 until there appears an output of the hydraulic switch 17 again. On the contrary, if there is an output of the hydraulic switch 17 and thus the pressure is discriminated as normal, there is no necessity of executing the process of step 110 and control advances directly to step 120.

At step 120, it is discriminated if the car is now being accelerated or decelerated. In particular, acceleration is calculated from the frequency of the pulse signals from the car speed sensor 8A and it is discriminated if a result of the calculation is equal to or gretaer than zero. If it is discriminated that the result is equal to or greater than zero, that is, the car is being accelerated, the control advances to step 130 to execute a traction control. On the contrary, if it is discriminated that the result is below zero, that is, the car is being decelerated, then step 140 is executed to reset a counter C which is used in the traction control as hereinafter described whereafter the present routine is finished and another routine for a conventional antiskid control (not shown) will be executed.

At step 130, as a first discrimination for executing the traction control, it is discriminated if the driving wheels are rotating at higher speed than an upper limit value for the driving wheel rotational speed. Here, the upper limit value means a speed represented by a line Vh illustrated in (A) of FIG. 4 which is a rotational speed at which a maximum frictional force acts on the driving wheels as calculated from the detection result Vc of the car speed sensor 8A, that is, an upper limit value within a range of rotational speed of the driving wheels at which the slip ratio becomes −10% or so. Reference symbol Vl in (A) of FIG. 4 indicates a lower limit value of the range. If at step 130 the detection result Vr of the wheel speed sensor 8B which is the rotational speed of the driving wheels is discriminated as Vr≧Vh, then step 150 is executed to set the counter C to a predetermined positive integer, and then step 160, a changing-over operation, is executed to change over the two position valve 33 to a pressurizing side wherein the pressure of the accumulator 12 is imparted to the pressure change-over valve 31. By this changing-over operation, a braking pressure is applied to the cut valve 14 so that a braking force acts upon the driving wheels RR and RL.

Then, step 170 is executed to discriminate if the rotational speed Vr and the accerelation αr of the driving wheel RL exceed their respective upper limit values. Here, the upper and lower limit values of the acceleration mean predetermined values αh and αl respectively, as illustrated in (B) of FIG. 4, and represent the upper and lower limit values of the acceleration which can be gained while a large frictional force is maintained between the driving wheels and the road surface as estimated from the weight of the car, a load to the driving wheels, and so on. Accordingly, when the condition of step 170 is met, the rotation of the driving wheels involves a large slip, and thus step 180 is executed to carry out a change-over control to the A port, the change-over control of the three position valve wherein pressurization from the pressure change-over valve 31 to the cut valve 14 all acts as a braking force.

On the contrary, if at step 170 it is not discriminated that the condition is met, it is discriminated at step 190 whether the actual rotational speed Vr and acceleration αr of the driving wheels are higher or not than the lower limit values Vl and αl for the speed and acceleration, respectively. Thus, if they are discriminated as higher, then the magnitude of a braking force to the driving wheels is regarded as suitable at present and the three position valve 13 is changed over to the B port to maintain constant volume of the upper chamber so that the braking force of the cut valve 14 (step 200) is imparted. Conversely, if it is discriminated at step 190 that either one or both of the speed and the acceleration are below the lower limit value or values thereof, then a braking force greater than a required level is applied to the driving wheels so that the C port of the three position valve 13 is connected to the hydraulic system to increase the volume of the upper chamber of the cut valve 14 and to reduce the braking force to the driving wheels (step 210).

The processes of steps 220 to 250, which are executed when it is discriminated at step 130 that the condition is not met, are provided to set a delay time to control of the two position valve 33. As described hereinabove, when it is discriminated at step 130 that the condition is met, the two position valve 33 which is normally at a pressure discommunicating side wherein the pressure of the accumulator 12 is not imparted to the pressure change-over valve 31, and thus the brake is actuated by the pressure of the accumulator 12. The three position valve 13 is then suitably actuated to accomplish traction control to obtain an optimum driving force in order to achieve fine control of the braking force corresponding to variations of the rotational speed Vr and the acceleration αr of the driving wheels. But when the present routine is executed again after lapse of the predetermined period of time, if at step 130 it is discriminated that the rotational speed Vr of the driving wheels is not over the upper limit value therefor and the two position valve 33 is promptly changed over to the pressure discommunicating side, then the braking force which has acted upon the driving wheels so far will disappear completely and thus vibrations due to such control may be brought about to the car.

The two position valve 33 is held to the pressure communicating side to produce a braking force only for the predetermined period of time after it has been discriminated that the condition of step 130 is no longer met and the braking force of the driving wheels is controlled by the three position valve 13. Accordingly, if it is discriminated at step 130 that the condition is not met, then step 220 is executed to determine whether the contents of the counter C, which was set at step 150, are greater than zero or not. If C>0, then the counter C is decreased at step 230. If it is discriminated at step 240 that the new contents of the counter C are not zero, then the aforementioned steps including step 160 are executed again. However, if C=0, it is regarded that the two position valve 33 is held to the pressure communicating side for the predetermined period of time so that control now proceeds to step 250. At step 250 the two position valve 33 is changed over to the pressure discommunicating side to effect control of the next steps including 180. When the counter becomes zero, step 180 is executed without decreasing the counter C again in accordance with the discrimination at step 220.

Figure 4:
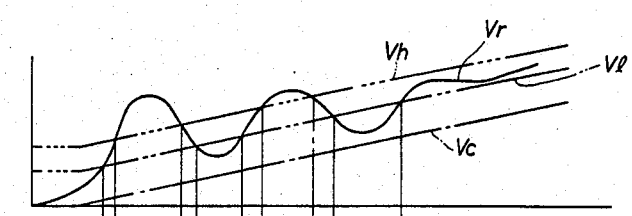
FIG. 4A-D is a timing chart of a control of the system of FIG. 2.
Figure 4:
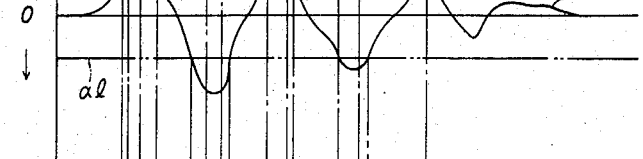
Figure 4:
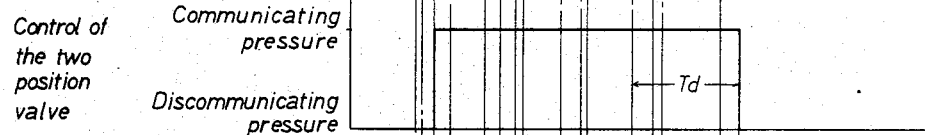
Figure 4:
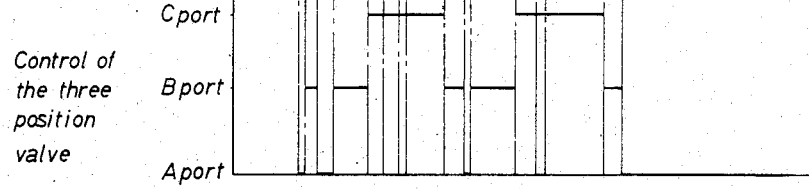

Controls of the two position valve 33 and the three position valve 13 which are executed in the control of the present step are illustrated in (C) and (D) of FIG. 4. As shown in (C) and (D) of FIG. 4, once the two position valve 33 is actuated, it transmits the pressure necessary to produce a braking force until the car is brought to a stabile accelerated condition. This is due to a delay time Td of the two position valve 33, that is, the time preset by the counter while the three position valve 13 suitably changes over the three ports to adjust the braking force to execute the traction control.

The present embodiment thus indicates an excellent example of a wheel slip controlling system which can attain traction control during acceleration of a car, as shown in (A) of FIG. 4, only by additionally providing a hydraulic controlling system 3 for traction control as described above.

If a hydraulic system of an antiskid brake system which is conventionally installed on a car is utilized and a constant braking force is provided to driving wheels by means of a newly provided hydraulic system, then the braking force is thereafter regulated by the same control as the antiskid brake system. Further, even if the electronic controlling device 9 with the antiskid brake system is used, since a slip controlling routine as illustrated in FIG. 3 is executed during acceleration of the car whereas another slip controlling routine for known antiskid braking (not shown) is executed during deceleration, the same electronic controlling device is used commonly and thus a control system having good operability can be constructed. Moreover, since the hydraulic control of the antiskid brake system is designed to allow finer pressure control than a conventional one, fine traction control can be attained readily.

It is to be noted that while in the present embodiment control of the braking force is all accomplished by the common three position valve 13 of the antiskid brake system in order to simply attain such excellent effects as described above, the two position valve 33 may otherwise be replaced by the three position valve which is controlled to regulate the hydraulic braking pressure itself which is provided to the pressure change-over valve 31. Control of the three position valve in the latter case may be one which executes substantially the same routine as that of FIG. 3. When the rotational speed and acceleration of driving wheels both exceed the respective upper limit values therefor, the pressure of the accumulator 12 may be imparted to the pressure change-over valve 31, but when they are both lower than the respective lower limit values therefor, the pressure of the accumulator 12 may be reduced. When in any other conditions, the braking force may be maintained constant.

The second embodiment will be described wherein the electronic controlling device 9 is constructed from electronic circuits without using a microcomputer. The second embodiment has, in hardware, a circuitry construction as illustrated in FIG. 5.

Figure 5:
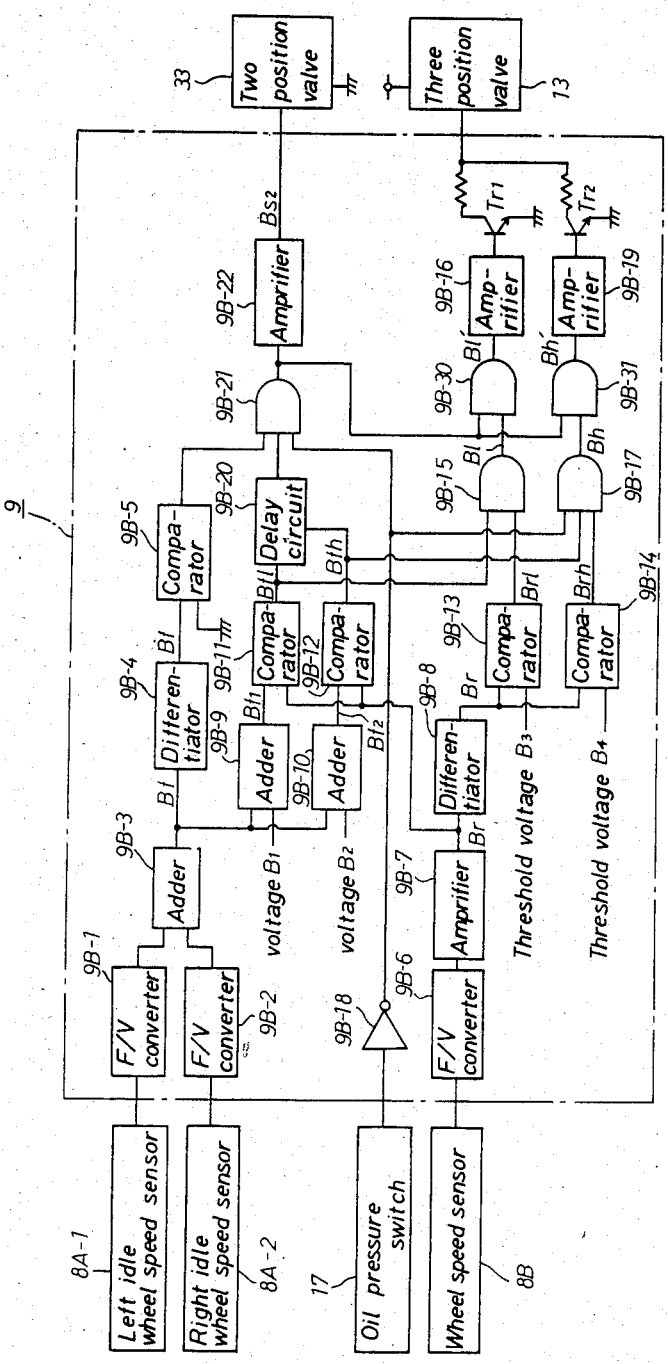
FIG. 5 is a block diagram illustrating a microcomputer section of the first embodiment when constructed by electronic circuits.

Referring to FIG. 5, reference symbols 9B-1 and 9B-2 denote F/V converters for converting the frequency of pulse signals, developed from left and right idle wheel speed sensors 8A-1 and 8A-2 and corresponding to rotations of idle wheels, into a voltage signal. Reference symbol 9B-3 denotes an adder for adding the thus converted voltage signal to obtain a voltage Bf corresponding to the travelling speed of the car (hereinafter referred to as a car speed voltage). 9B-4 denotes a differentiator for differentiating the car speed voltage Bf to obtain a voltage Bf corresponding to an acceleration of the car (hereinafter referred to as a car acceleration voltage). 9B-5 denotes a comparator for comparing the car acceleration voltage Bf with the ground voltage (0 volt) to determine whether the car is being accelerated or not.

Further, reference symbol 9B-6 denotes an F/V converter for converting a frequency of pulse signals developed from the wheel speed sensor 8B into a voltage signal. 9B-7 denotes an amplifier for amplifying the voltage signal from the F/V converter 9B-6 to a voltage corresponding to the car speed voltage Bf obtained from the adder 9B-3 to obtain a driving wheel speed voltage Br indicative of the speed Vr of driving wheels. 9B-8 denotes a differentiator for differentiating the driving wheel speed voltage Br to output a driving wheel acceleration voltage Br.

In addition, reference symbols 9B-9 and 9B-10 denote adders for adding predetermined voltages B1 and B2 to the car speed voltage Bf developed from the adder 9B-3 and corresponding to the travelling speed of the car to output reference voltages Bf1 and Bf2 for determination of a degree of an acceleration slip of the car. Respectively, 9B-11 and 9B-12 denote comparators for comparing the reference voltages Bf1 and Bf2 outputted from the adders 9B-9 and 9B-10 with the driving wheel speed voltage Br outputted from the amplifier 9B-7 to output voltage signals Bfl and Bfh of a high level when Bf1≦Br and Bf2≦Br, respectively. 9B-13 and 9B-14 denote comparators for comparing the driving wheel acceleration voltage Br outputted from the differentiator 9B-8 with predetermined voltages B3 and B4 to output voltage signals Brl and Brh of a high level when Br≧B3 and Br≧B4, respectively.

The voltage signals Bfl and Brl outputted from the comparators 9B-11 and 9B-13 are inputted to an AND circuit 9B-15. A voltage signal Bl outputted from the AND circuit 9B-15 is inputted to another AND circuit 9B-30 at the next stage, and a signal Bl' outputted from the AND circuit 9B-30 is provided via an amplifier 9B-16 to the base of a transistor Tr1 as a controlling signal for changing over the three position valve 13 to the A port or to the C port. The voltage signals Bfh and Brh outputted from the comparators 9B-12 and 9B-14, respectively, are inputted to a further AND circuit 9B-17, and a signal from the hydraulic switch 17 is also inputted to the AND circuit 9B-17 via a NOT circuit 9B-18. A voltage signal Bh outputted from the AND circuit 9B-17 is inputted to a yet further AND circuit 9B-31 from which a voltage signal Bh' is outputted. The voltage signal Bh' is applied via an amplifier 9B-19 to the base of another transistor Tr2 as a controlling signal for changing over the three position valve 13 to the B port. Further, an output of an AND circuit 9B-21 is inputted via the AND circuits 9B-30 and 9B-31 to the amplifiers 9B-19 and 9B-16, respectively. Accordingly, the three position valve 13 is normally controlled to the A port.

Meanwhile, a voltage signal which is outputted from the comparator 9B-5 indicates that the car is in an accelerating condition, another voltage signal outputted from the comparator 9B-12 via a delay circuit 9B-20 and another voltage signal outputted from the hydraulic switch 17 via the NOT circuit 9B-18 are inputted to an AND circuit 9B-21. An output terminal of the AND circuit 9B-21 is connected to an amplifier 90-22 to provide an actuating signal to the two position valve 33.

It is apparent that the circuit construction as described above can attain such control of the two position valve 33 and the three position valve 13 as shown in FIG. 4. In particular, the delay circuit 9B-20 corresponds to means for producing a delay of control of the counter C provided by the above described steps 220 to 240 while a signal amplified by the amplifier 9B-19 corresponds to results of determination provided by step 180 and a signal amplified by the amplifier 9B-16 corresponds to the process at step 200. In this manner, the components of the embodiments described above may be suitably chosen without departing from the scope of the present invention.

Figure 6:
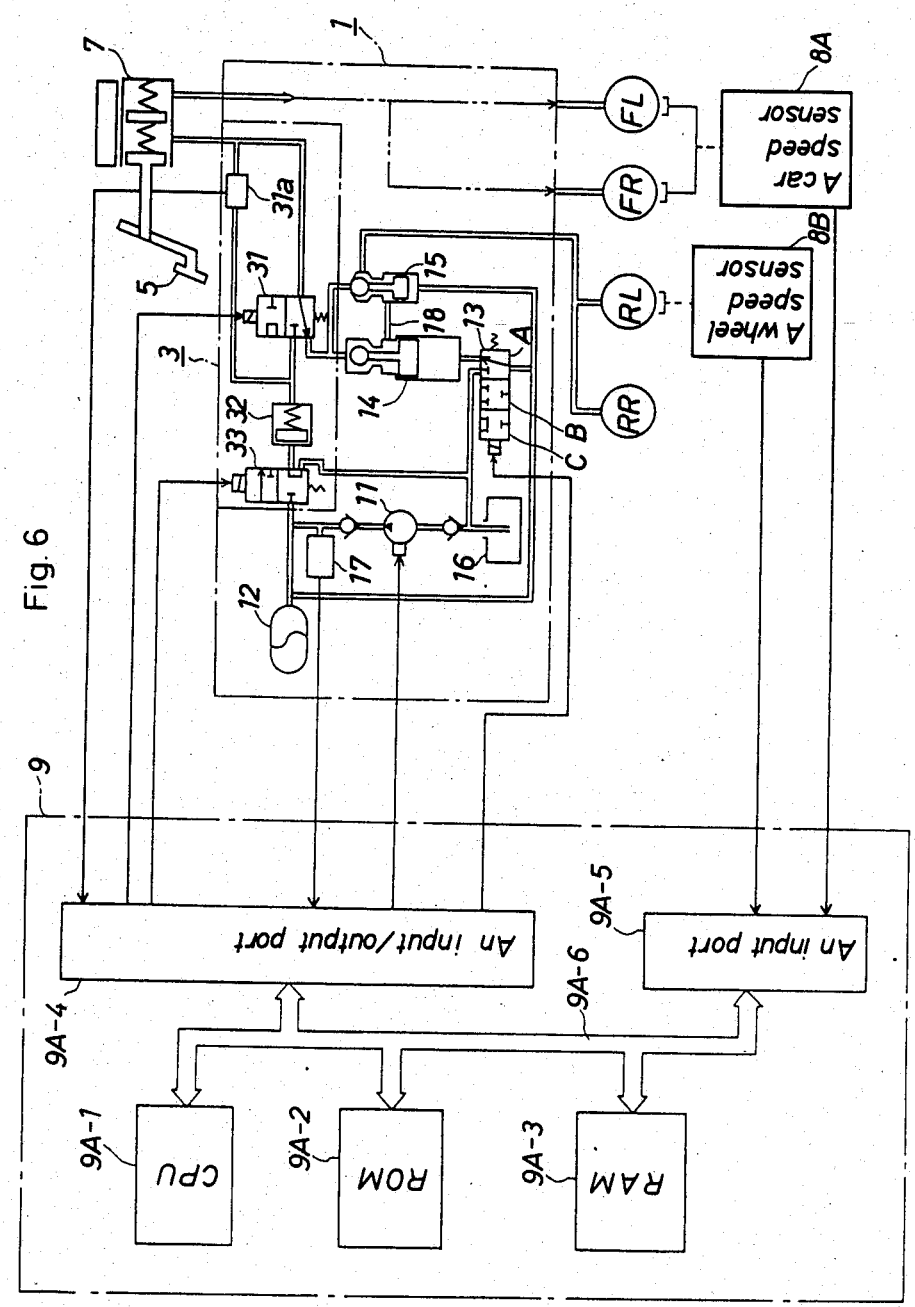
FIG. 6 is a block diagram illustrating construction of a second embodiment.

Now, description will be given of the second embodiment of the invention. The second embodiment is different from the first embodiment in that it additionally includes a differential pressure switch 31a and the change-over valve 31 is replaced by a pressure change-over valve 31 while four new steps are additionally provided to the flowchart. In particular, referring to FIG. 6, the differential pressure switch 31a is additionally provided to the embodiment of FIG. 2 and develops a signal to the electronic controlling device 9 when the pressure on the master cylinder 7 side is higher. The pressure change-over switch 31 is changed over in response to an output of the differential pressure switch 31a.

The electronic controlling device 9 detects such conditions of the braking hydraulic system as described above and develops controlling outputs depending upon results of such detections. In particular, the electronic controlling device 9 receives, as detection information of the braking hydraulic system, output signals of the car speed sensor 8A, wheel speed sensor 8B, hydraulic switch 17 and differential pressure switch 31a and controls the pump 11, three position valve 13, pressure change-over valve 31 and two position valve 33 of the hydraulic system depending upon results of such detections.

Figure 7:
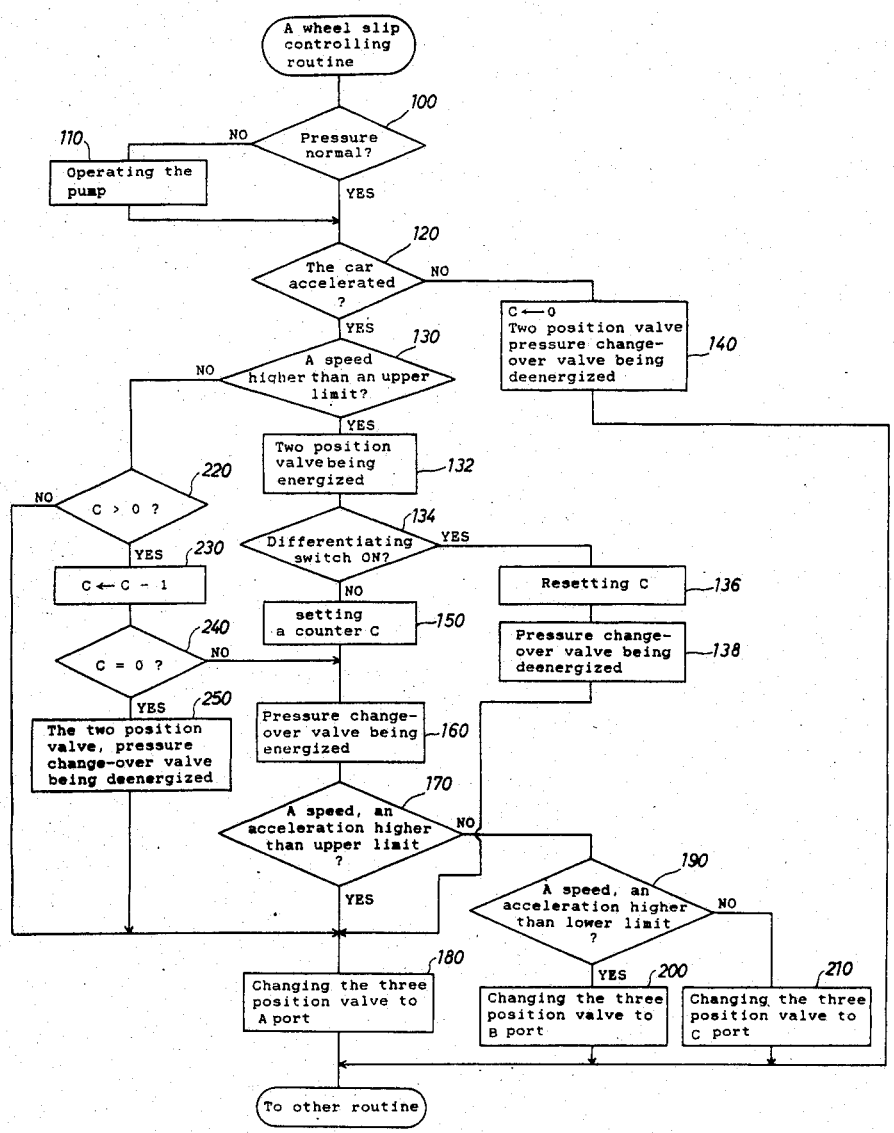
FIG. 7 is the flow chart of a control program for the system of FIG. 6.

A flowchart of FIG. 7 will now be described. The flowchart is drawn for the second embodiment and includes additional steps 132, 134, 136 and 138 to the flowchart of FIG. 3. If the detection result Vr of the wheel speed sensor 8B which indicates the rotational speed of the driving wheels is determined as $Vr \geq Vh$ at step 130, then the two position valve 33 is energized at step 132 to prepare hydraulic oil pressure for traction control. Then at step 134, the differential pressure switch 31a is checked to determine whether it develops an output or not. Here, if there is an output from the differential pressure switch 31a, it is determined "YES" as the brake pedal 5 is treadled down sufficiently, and then at step 136, the counter C is reset to zero whereafter the change-over valve 31 is deenergized or held deenergized at step 138. Thereafer, step 180 is executed to change over the three position valve 13 to the A port.

As described above, if the car is being accelerated and the brake pedal 5 is treadled down sufficiently, the hydraulic pressure of the brake master cylinder 7 is imparted to the wheels via the hydraulic pressure change-over valve 31, cut valve 14 and bypass valve 15. Thus, slipping control as desired by the driver during acceleration, can be attained.

On the contrary, if there is no output from the differential pressure switch 31a at step 134 and it is determined "NO", subsequently step 150 is executed so that a predetermined positive integer is set in the counter C. Then, by the process of next step 160, the solenoid of the pressure change-over valve 31 is energized so that the pressure of the accumulator 12 is applied as a braking pressure to the cut valve 14 via the two position valve 33, cylinder 32 and pressure change-over valve 31.

Since the two brake oil pressures are instantaneously selected by the pressure change-over valve 31 of the electromangetic type, interference of the two hydraulic circuits and inadvertent application of a pressure to wheel cylinders of the brake system for the wheels can be prevented. Accordingly, responsiveness and pedal feeling are improved as compared with a change valve such as a shuttle valve which automatically selects a higher pressure side depending upon a difference in pressure. Besides, oil consumption for changing over becomes unnecessary.

It is to be noted that change-over of the hydraulic pressure by the pressure change-over valve 31 in the present embodiment would provide such effects as described below in assembly of a car. In particular, while deairation of a standard hydraulic circuit is difficult once the hydraulic circuit is constructed, such deairating operation can be carried out simply since air in the hydraulic circuit of the cylinder 32 can be extracted to the reservoir 16 if the hydraulic pressure of the hydraulic circuit of the brake master cylinder 7 is raised after the hydraulic circuit is deairated by a normal process and the pressure change-over 31 is repeatedly turned on and off.

A timing chart for the second embodiment is similar to that of FIG. 4 for the first embodiment.

Figure 8:
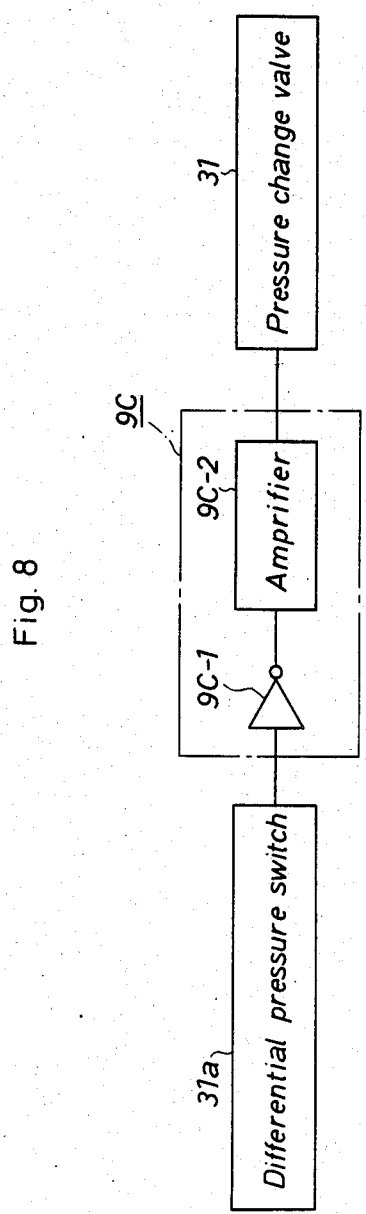
FIG. 8 is a block diagram of an electronic circuit including a differential pressure switch.

The present embodiment can also be constructed with an electronic circuit in place of the microcomputer. This modification is similar to that of FIG. 5 of the first embodiment and includes an additional electronic controlling device 9C as described below. In particular, the electronic controlling device 9C includes, as shown in FIG. 8, an inverter 9C-1 and an amplifier 9C-2 for inverting and amplifying an output signal of the differential pressure switch 31a to drive the pressure change-over valve 31. When there is no output signal from the differential pressure switch 31a, the pressure change-over valve 31 will imparts the hydraulic pressure of the accumulator 12 side to the brake system for the wheels.

What is claimed is:

1. A wheel slip controlling device, comprising:
   (a) braking means operable by a driver of a car for braking rotation of wheels at least including driving wheels, wherein said braking means includes a brake pedal adapted to be actuated by operation of the driver of the car, and a master cylinder for providing a pressure corresponding to an extent of actuation of said brake pedal to an antiskid controlling means;
   (b) slip detecting means for detecting a slipping condition of said wheels to output a slip signal indicative of the slipping condition, wherein said slip detecting means includes a first sensor for detecting the speed of said driving wheels, and a second sensor for detecting the speed of the car;
   (c) traction controlling means responsive to said slip signal, said antiskid controlling means receiving signals from said traction controlling means, for controlling the pressure to be imparted from said braking means by way of a self-contained hydraulic pressure source means to control braking slip of said wheels at least including said driving wheels, wherein said antiskid controlling means includes
      (1) said hydraulic source means for storing, actuating and accumulating hydraulic pressure,
      (2) a magnet change-over valve connected to said hydraulic source means and being actuated by said traction controlling means to change over to three positions wherein it increases the hydraulic pressure at an A port thereof, it holds the hydraulic pressure at a B port thereof, and it reduces the hydraulic pressure at a C port to adjust the braking force,
      (3) a valve regulating a hydraulic pressure either from said hydraulic source means or said braking means and said valve being controllable by oil pressure from said magnet change-over valve, and
      (4) a change-over device including a change-over valve adapted to be changed over in response to a signal from said traction controlling means, and a pressure change-over valve for receiving the hydraulic pressure from said change-over valve via a cylinder and the hydraulic pressure from said master cylinder said pressure change-over valve being responsive to the traction controlling means to output the greater of the hydraulic pressures to said valve.

2. A wheel slip controlling device according to claim 1, wherein said traction controlling means includes
   (d1) means for changing over said magnet change-over valve to said A port when the driving wheel speed and the driving wheel acceleration which is obtained by differentiation of the driving wheel speed exceed a first upper limit value Vh and a second upper limit value $\alpha h$, respectively, to increase the hydraulic pressure to be imparted to said driving wheels,
   (d2) means for changing over said magnet change-over valve to said B port when the driving wheel speed and the driving wheel acceleration both exceed the first lower limit valve Vl and the second lower limit value $\alpha l$, respectively, to hold the hydraulic pressure to be imparted to said driving wheels, and
   (d3) means for changing over said magnet change-over valve to said C port when the driving wheel speed and the driving wheel acceleration are of values other than in (d1) and (d2), so that the hydraulic pressure to be imparted to said driving wheels is reduced.

3. A wheel slip controlling device according to claim 1, wherein said change-over device includes a change-over switch for detecting said two hydraulic pressures inputted to said pressure change-over valve, and said pressure change-over valve is controlled by said traction controlling means.

4. A wheel slip controlling device according to claim 3, wherein a counter is reset to deenergize said pressure change-over valve when said traction controlling means determines from an output of said change-over switch that the pressure of said master cylinder is higher than the pressure from said cylinder.

* * * * *